United States Patent [19]
Yellin

[11] 3,742,909
[45] July 3, 1973

[54] CAGE FOR PETS AND THE LIKE

[76] Inventor: Bernard Yellin, 5252 S. Kolmar Avenue, Wilmette, Ill.

[22] Filed: Feb. 4, 1972

[21] Appl. No.: 223,647

[52] U.S. Cl. .................................................. 119/17
[51] Int. Cl. ........................................... A01k 31/08
[58] Field of Search ................................. 119/17, 18

[56] References Cited
UNITED STATES PATENTS

| 1,649,902 | 11/1927 | Johnson | 119/17 |
| 178,142 | 5/1876 | Gunther | 119/18 |
| 3,381,664 | 5/1968 | Barlocci | 119/18 X |
| 3,556,058 | 1/1971 | Smiler | 119/17 |

FOREIGN PATENTS OR APPLICATIONS

| 1,031,694 | 6/1966 | Great Britain | 119/18 |
| 958,301 | 5/1964 | Great Britain | 119/17 |
| 835,279 | 5/1960 | Great Britain | 119/17 |
| 553,648 | 1/1957 | Belgium | 119/17 |

Primary Examiner—Antonio F. Guida
Assistant Examiner—J. A. Oliff
Attorney—Max R. Kraus

[57] ABSTRACT

A cage for pets and the like having a cage body with a slidable and removable tray at the bottom of said cage body, with one of the upright members of the cage body being of a reduced height and provided with a movable gate at the lower end thereof, which movable gate when lowered extends the height of said upright member to substantially the height of the other upright sides of the cage body but which gate when elevated permits withdrawal and/or removal of the tray from the cage body while trapping the animal or bird within the cage.

3 Claims, 3 Drawing Figures

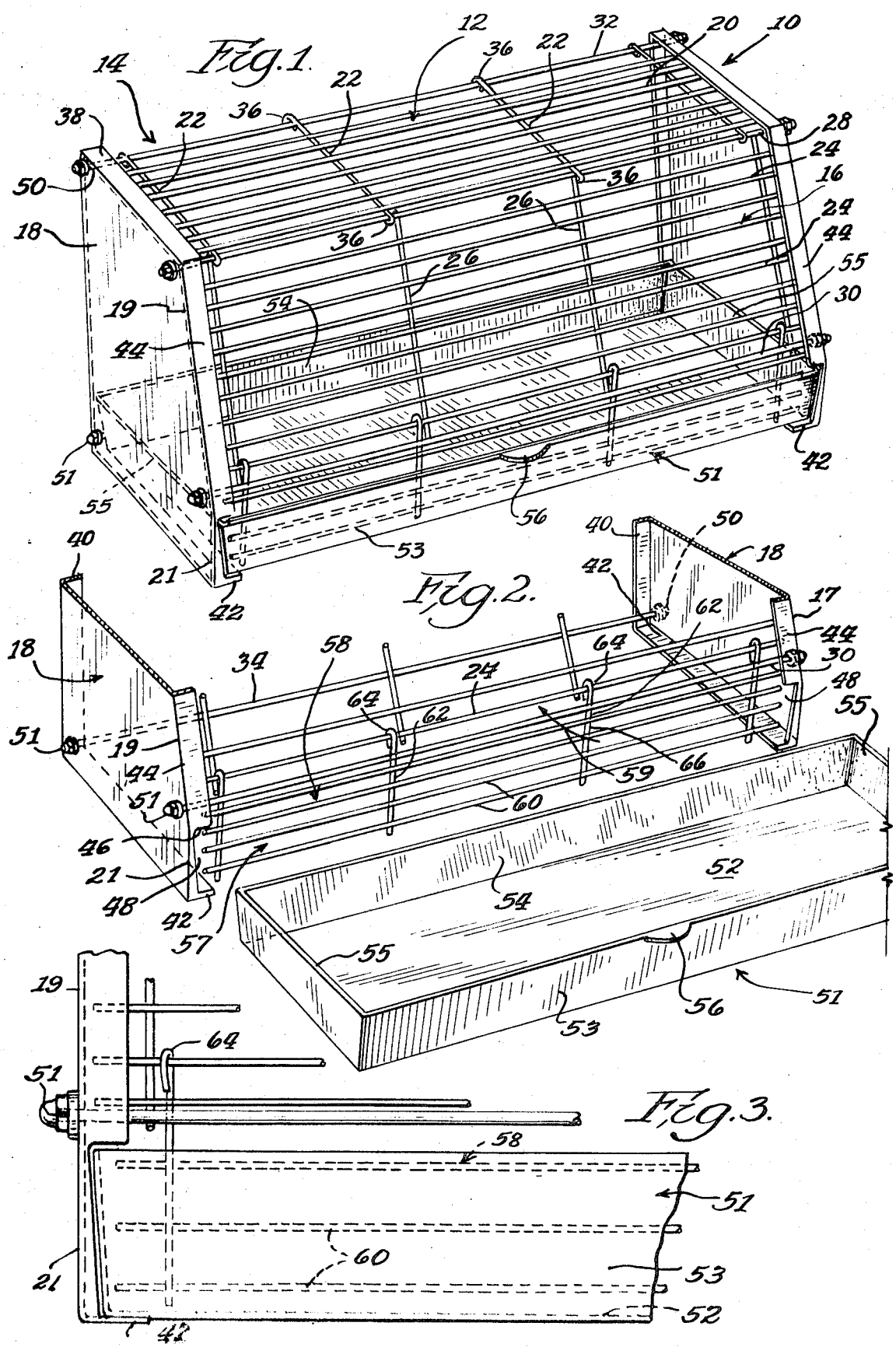

CAGE FOR PETS AND THE LIKE

BRIEF SUMMARY OF THE INVENTION

It is well-known that the bottom of an animal and/or bird cage has to be frequently cleaned. One of the objects of this invention is to provide the bottom of such a cage with a retractable and removable tray which forms the bottom of the cage and in which one of the upright members forming one of the sides of the cage body is of a reduced height, with a gate secured to said upright meber, which gate may be manually moved to an elevated position or to a lowered position and when in the lowered position comletes the height of the said upright member of the cage body but which when elevated permits withdrawal and removal of the tray for cleaning same, without permitting the animal or bird to escape from the cage body.

Another object of this invention is to provide a cage of the foregoing character in which the front side of the cage body is of a reduced height and is provided with a gate hinged to the bottom of said front side to complete the overall height of the front side, however, said gate may be hingedly elevated and when so elevated permits the tray to be removed from the bottom of the cage body without permitting the animal or bird to be released from the cage.

BRIEF DESCRIPTION OF THE DRAWINGS

In the drawings:

FIG. 1 is a perspective view of the cage with the bottom tray therein and with the front gate in its lowered position.

FIG. 2 is a partial view of the cage body with the tray removed; and

FIG. 3 is a fragmentary front elevational view with the bottom tray in the position shown in FIG. 1.

The cage body is generally designated by the numeral 10 and comprises a top horizontal member 12, a rear vertical side 14, a front side 16 all formed of wires, and spaced sides 18 formed of plastic.

The top member 12 is formed of a plurality of spaced longitudinally extending wires 20 brazed or otherwise secured to spaced transversely extending wires 22. The front side 16 is formed of a plurality of spaced longitudinally extending wires 24 brazed or otherwise secured to spaced transversely extending wires 26. Extending across the top and bottom of the front side 16 are rods 28 and 30 respectively, which are longer than the length of the wires 24. The rods 28 and 30 are brazed to the opposite ends of the transverse wires 26.

The rear side 14 is formed similar to the front side 16 with longitudinally extending wires similar to wires 24 which are brazed to transversely extending wires similar to wires 26, and extending across the top and bottom of the rear side 14 are rods 32 and 34 which are similartto rods 28 and 30 on the front side and are of the length of rods 28 and 30. The rear side 14 has a slidable wire door (not shown) which may be slid to open position to gain access to the interior of the cage from the rear.

The transverse wires 22 on the top member 12 have their opposite ends looped as at 36 around the top rods 28 and 32 of the front and rear sides 16 and 14 to thereby connect the top 12 to the front and rear sides 16 and 14 respectively. This looping connection also permits hinging between the top, front and rear sides for collapsing same.

The spaced sides 18 are identically formed and are made of a plastic material. The front edge 19 of the side 18 is inclined and slopes outwardly from the top to the bottom, with the lower end 21 of the front edge being vertical. Each side 18 has an inwardly extending top flange 38, a rear flange 40, a bottom flange 42 and a front flange 44. The front flange 44 terminates as at 46 at the top of the vertical edge 21, therefore, there is a recess 48 between the bottom of the front flange 44 and the bottom horizontal flange 42. The sides 18 are each provided with four spaced openings 50 which receive the ends of the rods 28, 30, 32 and 34. The sides 18 are secured to the wire cage by suitable nuts 51 secured to the ends of the rods.

Slidably supported on the bottom flanges 42 of the sides 18 is a tray 51 having a bottom 52, upstanding front and rear walls 53 and 54 and spaced side walls 55. The front wall 53 has a projection or tab 56 for manual engagement.

The wire front 16 of the cage slopes correspondingly to the slope of the front edge of the sides 18, and with the sides 18 secured to the wire cage, the sides 18 will enclose the opposite ends of the top, front and rear of the wire cage. The rod 30 of the front side 16 is positioned approximately adjacent the lower edge 46 of the front flange 44. Thus, there is an open space 57 between the lower end of the front side 16 of the cage and the bottom of the sides 18. This open space 57 is to be closed by a gate generally indicated at 58.

The gate 58 is hingedly secured to the front side 16 so that the gate can be manually moved on its hinges rearwardly, as indicated by the arrows 59 in FIG. 2, to lift it or it can be left in its dropped or lowered position, as shown, so that it closes the open space 57 below the rod 30. The gate 58 is formed of spaced longitudinal wires 60 brazed to transverse wires 62. The upper ends of the transverse wires 62 are looped as at 64 around the bottom longitudinal wires 24 of the front side. However, the gate 58 can hinge with respect to the front side. However, it can only hinge to be moved rearwardly as the rod 30 will prevent further forward hinging.

In normal position, the tray is positioned to the rear, as shown in FIG. 1, with the front wall 53 of the tray positioned forwardly or outwardly of the gate. With the gate in its lowered or vertical position, the tray can be pulled forwardly until it is stopped by the gate engaging the rear wall 54 of the tray. However, the tray can be removed and withdrawn from the cage by manually hinging the gate upwardly so that it clears the rear wall of the tray. This is done as the tray is being pulled forwardly and before the gate engages the rear wall of the tray.

When it is desired to clean the tray, the tray is manually pulled forwardly until the rear wall 54 of the tray is immediately adjacent the gate, at which time the gate is hinged upwardly so that the rear wall 54 of the tray can pass the bottom of the raised gate to permit the tray to be withdrawn. During this procedure it will be noted that there is no opening between the raised gate and the rear of the tray and the animal or bird in the cage cannot escape therefrom when the tray is being removed. As the tray is moved outwardly of the cage body, the gate will drop by gravity so that the full height of the front of the cage body is complete. It shoulw be noted that the removal of the tray is done while the cage is resting on the table or other flat surface so that when the tray is removed the bottom of the table or other surface acts as a bottom closure for the cage To reinsert the removable tray, it is only required that the rear 54 of the tray be positioned against the front of the gate and pushed rearwardly which elevates the gate and keeps it over the tray so that the animal or bird is confined and cannot escape while the tray is being inserted into the cage.

As shown in FIG. 1, the gate 58 is hinged to its closed position where it extends in a vertical plane below the wire front side 16 of the cage body and in this position it completes the front closure for the front of the cage body.

The wire cage body can be collapsed when the sides 18 are removed, that is, the fron 16 and top 12 and back 14 of the wire parts overlaying each other and the sides and bottom tray can be positioned so that the entire unit occupies a minimum of space in a shipping carton or the like.

What is claimed is:

1. A cage body formed of a top horizontal member, a rear vertical side, a front generally vertical side, all formed of interconnected longitudinally and transversely extending wires and hingedly connected for collapsing, longitudinally extending rods connected to said top member, front side and rear side, and extending outwardly of the sides of said top member, front side and rear side, and spaced solid sides formed of plastic provided with spaced openings to receive the ends of said rods, fastening means on the ends of said rods for detachably securing the top member front side, and rear side to said solid sides, said solid sides having inwardly extending glanges along the top member, rear side, bottom and front side, said flanges covering the ends of the top member, rear side and front side wires, above the bottom of the sides to provide a front gate opening, a wire gate hingedly secured to the front side to extend over the front gate opening, means for limiting the forward hinging movement of said gate, a tray slidably supported on the solid side bottom flanges, said tray having a front wall, a rear wall and spaced side walls, said front flanges terminating in the area of the gate opening and providing recesses for accommodating the tray, said gate normally extending vertically and rearwardly of the front wall of the tray and blocking the withdrawal of the tray by engaging the rear wall of the tray, said gate being hinged rearwardly for unblocking the tray and permitting the withdrawal of said tray.

2. A structure as set forth in claim 1 in which the means for limiting the forward hinging movement of the gate comprises a rod detachable connected to the solid sides and extending between said solid sides and extending forwardly of the gate.

3. A structure as set for th in claim 1 in which the front side of the cage body is inclined downwardly and forwardly from the top member toward the bottom.

* * * * *